United States Patent

Porter et al.

[15] 3,674,235
[45] July 4, 1972

[54] PLASTIC VALVE

[72] Inventors: Donald E. Porter; Jack Burkholder, both of Tulsa, Okla.

[73] Assignee: Water and Gas Plastics Products, Tulsa, Okla.

[22] Filed: Feb. 16, 1970

[21] Appl. No.: 11,465

[52] U.S. Cl. ...........................................................251/162
[51] Int. Cl. ..................................F16k 25/00, F16k 1/22
[58] Field of Search...............251/162, 163, 309, 310, 317, 251/312

[56] References Cited

UNITED STATES PATENTS

| | | | |
|---|---|---|---|
| 3,536,101 | 10/1970 | Bosworth | 251/317 X |
| 3,525,363 | 8/1970 | Gore et al. | 251/309 X |
| 779,786 | 1/1905 | Kilbourn | 251/162 |
| 3,033,515 | 5/1962 | Brisbane | 251/317 X |
| 2,505,998 | 5/1950 | Sleeper et al. | 251/163 |
| 3,254,872 | 6/1966 | Roos | 251/163 |
| 3,437,310 | 4/1969 | Inch | 251/317 |
| 3,484,078 | 12/1969 | Haenky | 251/163 X |

FOREIGN PATENTS OR APPLICATIONS

| | | | |
|---|---|---|---|
| 1,082,550 | 6/1954 | France | 251/317 |
| 865,388 | 4/1961 | Great Britain | 251/317 |

*Primary Examiner*—Samuel Scott
*Attorney*—William S. Dorman

[57] ABSTRACT

A plastic valve for use in connection with a tapping machine or tapping tool during a tapping operation on a plastic flow for connection of a by-pass line, or the like, thereto. The plastic valve comprises means for securing thereof to the flow line for receiving a tapping machine therethrough. During the tapping operation, the valve is in an open position for precluding interference with the tapping operation. Subsequent to removal of the tapping machine the valve may be closed for precluding leakage of fluid from the flow line during the connection of the by-pass, or the like, thereto. Upon completion of the work operation, the valve may be opened again to provide communication between the flow line and the by-pass line.

2 Claims, 15 Drawing Figures

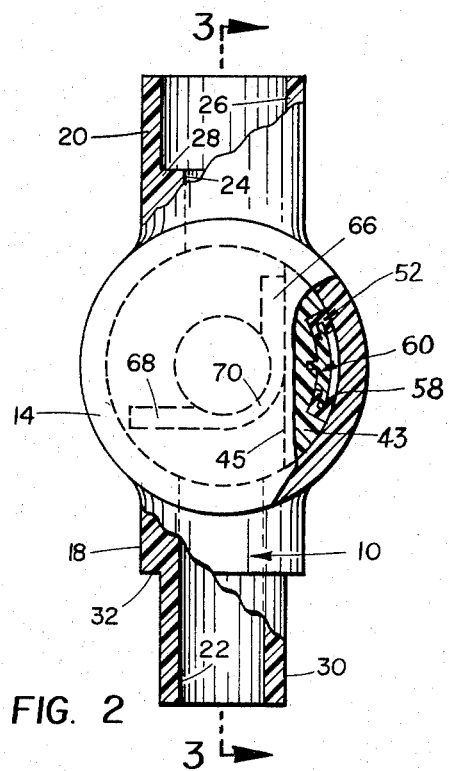

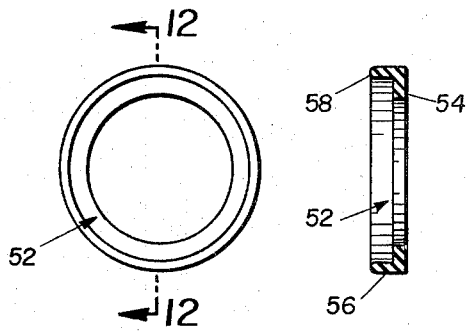
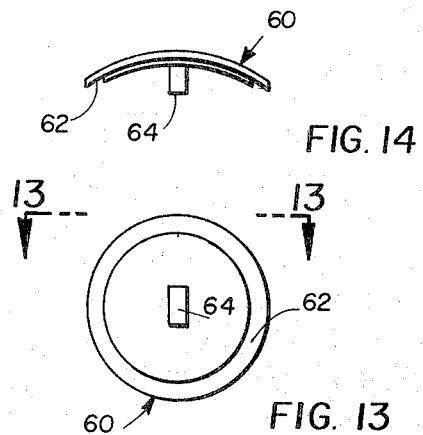
FIG. 11  FIG. 12  FIG. 14  FIG. 13
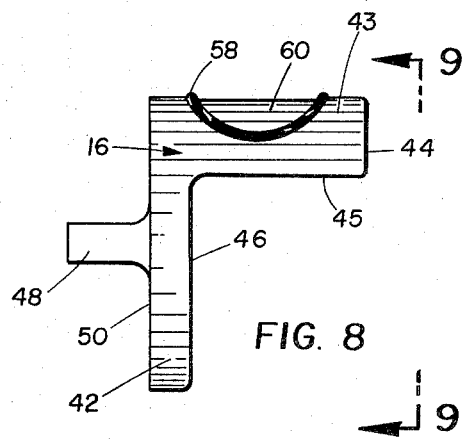
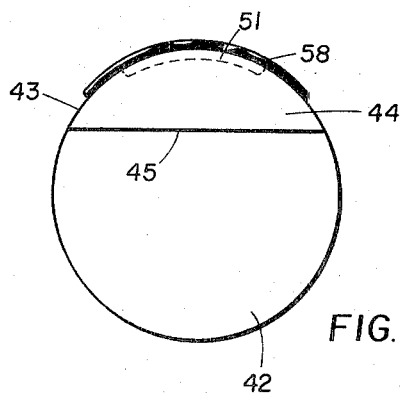
FIG. 8  FIG. 9
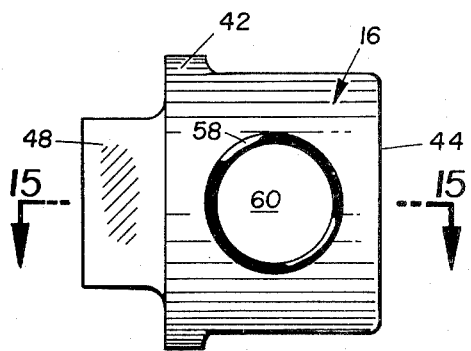
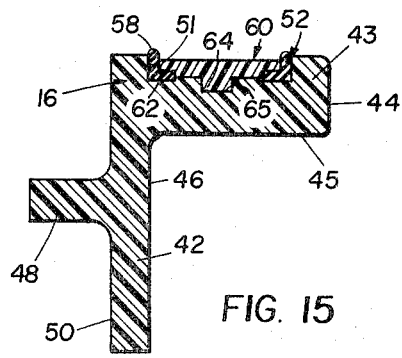
FIG. 10  FIG. 15
INVENTORS
DONALD E. PORTER
JACK BURKHOLDER
BY William S. Dorman
ATTORNEY

PLASTIC VALVE

This invention relates to improvements in valves and more particularly, but not by way of limitation, to a plastic valve particularly designed and constructed for use in connection with a tapping machine, or the like.

In many flow systems, such as a city water supply system, it is frequently necessary to add a branch line to the main supply line, such as when it is desired to interpose a flow line to a meter for supplying of water to a new building, or the like. In order to do this, it is necessary to tap the main water supply line and attach the branch line thereto without shutting off or interrupting the flow of liquid moving through the main line.

This is normally accomplished by securing a conduit to the outer periphery of the main pipe line by means of a saddle or other connecting member. A tapping machine is secured to the outer end of the conduit member and is normally provided with a tapping or cutting member on one end thereof which is moved through the conduit and utilized for cutting through the sidewall of the pipe. Of course, sealing means is provided in the tapping machine for precluding leakage of fluid from the flow line during the cutting or tapping operation. A valve is interposed in the conduit and is opened during the tapping operation for permitting passage of the cutting member therethrough and precluding interference with the tapping operation. Subsequent to the cutting of the main fluid supply line, the cutter element is backed off, and the valve is closed to permit removal of the tapping machine from the conduit, and to preclude leakage of fluid from the cut line. The by-pass, branch line, or the like, is then connected to the conduit in lieu of the tapping machine, and upon completion of the by-pass line installation, the valve may be opened to provide communication between the main supply line and the by-pass line, or the like.

This operation is normally done in a ditch, or the like, and upon completion, the main supply line, valve, and by-pass or branch line are covered or buried, and remain so unless trouble occurs at some future date wherein repair work is necessary.

Many water supply systems today are constructed from plastic pipes and it is desirable that the branch lines and any connecting members utilized in connection therewith be similarly constructed from plastic materials. The present invention contemplates a novel plastic valve for use with a tapping operation for providing a by-pass, branch line, or the like, for an existing plastic pipe main line flow system. The novel valve comprises a cylindrical housing having a substantially L-shaped closure member rotatably disposed therein to provide alternate open and closed positions therefor. The closure member is particularly designed and constructed for providing a full opening of the valve in the open position thereof to preclude interference with the tapping machine extending therethrough. Seal means is provided on the outer periphery of the closure member for sealing of the valve in the closed position, and cam means is provided for cooperation between the housing and closure member to assure an efficient sealing of the valve in the closed position.

It is an important object of this invention to provide a plastic valve for use in connection with a tapping machine for securing a branch line, or the like, to a main flow system.

It is another object of this invention to provide a plastic valve for facilitating connection of a branch line, or the like, to a main fluid flow system wherein an efficient sealing of the valve in the closed position is assured.

Still another object of this invention is to provide a novel plastic valve for use with tapping machines which is simple and efficient in operation and economical and durable in construction.

Other and further objects and advantageous features of the present invention will hereinafter more fully appear in connection with a detailed description of the drawings in which:

FIG. 1 is a side elevational view of a flow line having a valve embodying the invention secured thereto.

FIG. 2 is a side elevational view partly in section of a valve embodying the invention in an open position and with portions thereof depicted in dotted lines for purposes of illustration.

FIG. 3 is a sectional view taken on line 3—3 of FIG. 2.

FIG. 8 is a side elevational view of closure member embodying the invention.

FIG. 9 is an elevational view taken on line 9—9 of FIG. 8.

FIG. 10 is a top view of the closure member depicted in FIGS. 8 and 9.

FIG. 11 is an elevational view of the seal member utilized in the invention.

FIG. 12 is a sectional view taken on line 12—12 of FIG. 11.

FIG. 13 is an elevational view of the seal retainer member utilized in the invention.

FIG. 14 is a view taken on line 14—14 of FIG. 13.

FIG. 15 is a sectional view taken on line 15—15 of FIG. 10.

Figure 4:
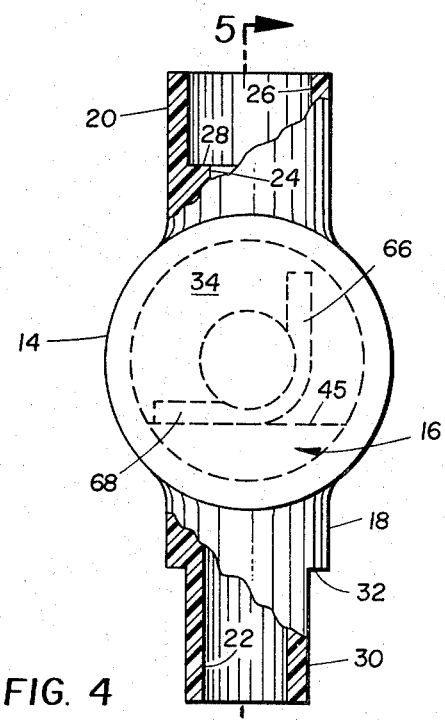
FIG. 4 is a view similar to FIG. 2 depicting the valve in a closed position.

Referring to the drawings in detail, reference character 10 generally indicates a valve adapted for installation on a pipe section 12 in a manner and for a purpose as will be hereinafter set forth. The valve is preferably constructed from a suitable plastic material as is well known in plastic pipe construction and comprises a substantially cylindrical central body portion 14 having a closure member 16 rotatably disposed therein. The housing 16 is provided with oppositely disposed aligned sleeves 18 and 20 extending radially outwardly therefrom. The sleeves 18 and 20 are provided with central bores 22 and 24, respectively, extending therethrough to provide inlet and outlet passageways for the valve 10. The bore 24 is preferably provided with an enlarged portion 26 forming an annular shoulder 28 on the inner periphery of the sleeve 20, and the outer periphery of the sleeve 22 is reduced at 30 to provide an annular shoulder 32 therearound for a purpose as will be hereinafter set forth.

One end of the cylindrical body 14 is closed by a wall 34 and the opposite end thereof is open as shown at 36 to provide access to the interior of the body 14. It is preferable to provide a pair of spaced annular grooves 38 and 40 on the inner periphery of the open end 36 for a purpose as will be hereinafter set forth.

The closure member 16 comprises a substantially disc shaped member 42 having an outer diameter substantially equal to the inner diameter of the cylindrical body 14 and is adapted for insertion within the open end 36 thereof whereby the closure 16 may be rotated about the axis of the body 14. An arm member 44 extends axially outwardly from one face 46 of the disc member 42. The outer periphery or surface 43 of the arm 44 is an extension of the outer circumference of the disc 42 and of a size complementary to the inner periphery of the body 14. The inner or inwardly directed surface 45 of the arm 44 is a chord of the circle defined by the disc 42. The maximum width of the arm 44 is particularly selected whereby the arm 44 will be disposed away from the aligned bores 22 and 24 in the open portion of the valve 10 to preclude interference with passage or movement through the open valve 10 as will be hereinafter set forth. An elongated centrally disposed handle member 48 is provided on the opposite face 50 of the disc 42 and extends axially outwardly therefrom for facilitating rotation of the cylindrical member 16 within the body 14 during opening and closing of the valve 10.

A circular recess 51 (FIGS. 9 and 15) is provided on the outer periphery of the arm 44 for receiving a seal member 52 therein. The recess is of a diameter somewhat larger than the diameter of the bores 22 and 24 and is disposed in substantial alignment therewith in a closed position of the valve 10. The seal member 52 comprises an annular body portion 54 having a circumferential flange 56 extending axially outwardly therefrom. The outer edge of the flange 56 is arcuate or spherical generally similar to the configuration of the usual or well known O-ring sealing member. When the seal member 52 is disposed within the circular recess of the arm 44 the circular flange 56 extends slightly outwardly therefrom whereby the sealing lip 58 thereof is exposed as particularly shown in FIGS. 8 and 15. The seal 52 is retained in position within the recess 51 by a retainer disc 60 which is of a general arcuate configuration corresponding to the configuration of the outer periphery of the arm 44 as particularly shown in FIG. 4. However, the outer periphery of the retainer 60 is recessed with respect to the outer periphery of the arm 43 surrounding the seal 52 for a purpose as will be hereinafter set forth.

The inwardly disposed surface of the disc 60 is provided with an annular recess 62 around the outer periphery thereof for bearing against the body 54 of the seal 52. A centrally disposed lug member 64 is also provided on the inwardly disposed surface of the disc 60 for engagement with a complementary recess 65 provided in the circular recess 51. In order to secure the retainer member 60 and seal member 52 in position a suitable glue such as an epoxy resin, or the like, may be utilized for cementing or adhering the lug 64 within the complementary recess 65.

A cam member comprising a pair of substantially mutually perpendicular leg members 66 and 68 united by an arcuate portion 70 is provided on the inwardly directed face 72 of the wall 34 which closes one end of the body 14. When the closure member 16 is disposed within the housing or body 14, the outer end 44 of the arm 43 bears against or is disposed very close to the face 72 of the wall 34 and the surface 45 of the arm 44 is disposed against the outer edge of the cam member. A suitable O-ring 76 or the like, is preferably disposed in the groove 40 for precluding leakage of fluid around the disc 42, and a suitable lock washer 78 may be snapped into the groove 36 and behind the disc 42 for retaining the closure member in position within the body 14.

As the closure member 16 is rotated within the housing 14 the surface 45 of the arm 44 rides along the cam surface 66–70–68, and the cam surface maintains the outer periphery of the arm 43 in close proximity of the inner periphery of the body 14. The lips 58 of the seal 52 move against the inner periphery of the body 14 during rotation of the closure member 16. The recessed position of the retainer member 60 provides an area or cavity for receiving the flexible material of the seal 52 as the flange 56 is distorted during rotation of the closure member 16 thus facilitating opening and closing of the valve 10 while providing an efficient sealing in the closed position thereof.

Figure 5:
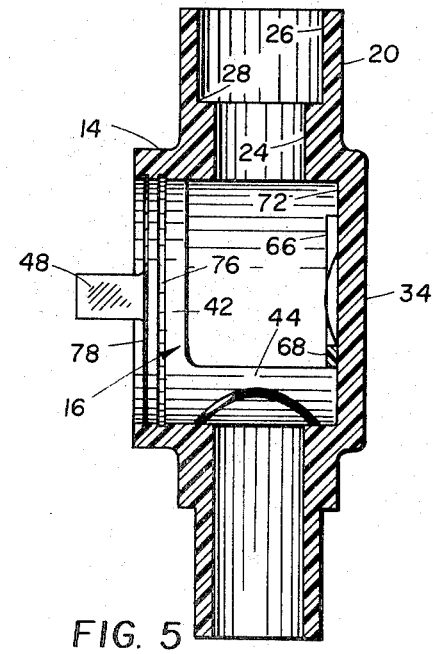
FIG. 5 is a sectional view taken on line 5—5 of FIG. 4.
Figure 6:
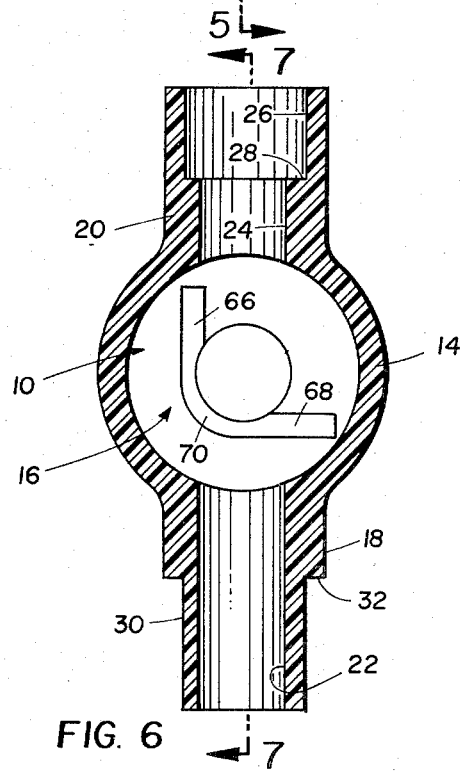
FIG. 6 is a sectional view of a valve housing embodying the invention.
Figure 7:
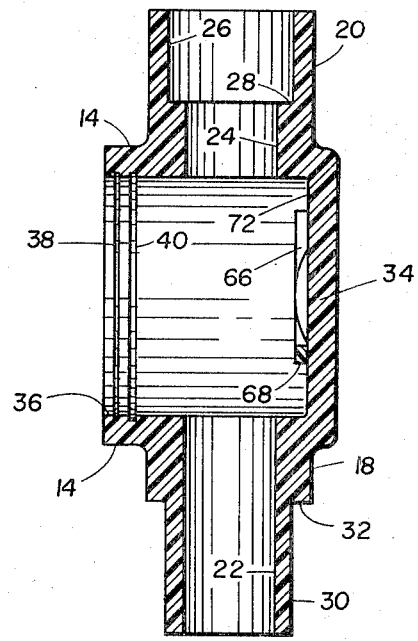
FIG. 7 is a sectional view taken on line 7—7 of FIG. 6.

In the full open position of the closure member 16, as shown in FIGS. 2 and 3, the surface 45 of the arm 44 will bear against the cam arm 66, and it will be readily apparent that there is no interference with the flow passageway through the valve. In the full closed position of the closure member 16, as shown in FIGS. 4 and 5, the surface 45 of the arm 44 will bear against the cam arm 68 and the seal member 52 will be concentrically disposed with respect to the bore 22 of the sleeve 18. The cam arm 68 positively precludes any upward or inward movement of the arm member 44 from the bore 22 regardless of the fluid pressure in the bore 22 acting against the arm 44, thus assuring an efficient sealing of the valve in the closed position thereof.

The sleeve members 18 and 20 provide coupling end portions for interposing the valve 10 within a flow line, or the like. For example, the reduced neck or male end portion 30 may be secured within the females end of a complementary pipe section (not shown) in any well known manner, such as cementing, or the like, and the male end of a second pipe section (not shown) may be similarly secured within the enlarged bore or female end 26 of the sleeve 20. In the present instance, the valve 10 is particularly adapted for installation on the outer periphery of the pipe section 12 and may be secured thereto in any suitable manner, such as by a saddle member generally indicated at 76. The saddle member 76 comprises a half-sleeve member 78 having a pair of oppositely disposed outwardly extending longitudinal flanges 80 (only one of which is shown in FIG. 1) provided along the open edge thereof. A complementary half-sleeve member 82 is provided with similar outwardly extending flanges 84 which may be bolted to the flanges 80 for securing the half-sleeves 78 and 82 around the outer periphery of the pipe 12. A radially outwardly extending sleeve 86 is provided on the half-sleeve 82 for receiving the reduced neck 30 of the sleeve 18 therein. The neck 30 may be cemented or otherwise secured to the sleeve 86 for securing the valve 10 thereto. A suitable sealing member such as an O-ring (not shown) is provided on the inner periphery of the half-sleeve 82 and concentrically disposed around the bore of the sleeve 86 for bearing against the outer periphery of the pipe 12 to preclude leakage of fluid between the pipe 12 and sleeve 86.

OPERATION

When it is desired to connect a branch line, by-pass or the like (not shown) to the main flow line 12, the valve 10 may be secured to the outer periphery thereof as hereinbefore set forth. The closure member 16 may be rotated within the body 14 to the full open position therefor as shown in FIGS. 2 and 3. In order to rotate the closure member 16, the lug 48 may be manually grasped, or a suitable wrench (not shown) or the like may be utilized for engaging the lug 48 to apply sufficient torque thereto for turning of the closure member. With the arm 44 thus moved to the full open position therefor a completely free passage between the bores 22 and 24 is provided through the valve 10.

A suitable tapping tool or tapping machine (not shown) is secured to the sleeve 20 in the usual manner whereby the cutting element (not shown) of the tapping machine is disposed in axial alignment with the bores 22 and 24. The tapping machine is normally provided with a suitable stuffing box or packing gland to preclude leakage of fluid during operation thereof, as is well known. The tapping machine is actuated in the normal manner for moving the cutting element through the valve 10 and into engagement with the outer periphery of the pipe 12. The cutting element is then utilized for cutting a hole through the sidewall of the pipe 12. The portion of the sidewall of the pipe 12 which is thus severed is normally called a coupon, and the severed coupon is retained on the cutting element to preclude loss of the coupon in the interior of the pipe 12.

As hereinbefore set forth, the sleeve 86 is sealed against the outer periphery of the pipe 12, thus precluding leakage of fluid therebetween upon the cutting of the pipe. Of course, the fluid within the pipe 12 fills the sleeves 86 and 18, the valve housing 14 and the sleeve 20, but the tapping maching, being provided with a packing member above the valve 10, precludes any loss of the fluid therefrom.

Subsequent to the severing of the coupon, the cutting element is retracted or back-off, carrying the coupon therewith. As the cutting element is retracted through the valve 10, the cutting end and coupon are moved sufficiently to clear the closure member 16, and the closure member may be rotated to the full closed position thereof as shown in FIGS. 4 and 5. As soon as the closure member 16 is in the full closed position, the seal member 52 will be disposed against the inner periphery of the housing 14 and around the bore 22 for efficiently sealing therearound. The cam arm 66 securely retains the arm 44 in position against the inner periphery of the housing, regardless of the pressure within the bore 22 acting thereof, thus holding the sealing lip 58 securely against the housing 14 for an efficient sealing around the bore 22.

When the valve 10 is thus closed, the tapping machine may be removed from connection therewith. The branch line, by-pass, or the like (not shown) may be secured with the sleeve 20 in the usual manner for connecting the main flow line 12 with a meter (not shown), or the like. When the branch line installation has been completed, and it is desired to establish a flow of fluid thereto, the closure member 16 may be rotated to the full open position thereof, whereby a portion of the fluid in the flow line 12 will be diverted through the valve 10 and into the branch line.

As hereinabove set forth, the flow line 12 is normally buried beneath the surface of the ground, and the connection of the branch line thereto is accomplished in a ditch or cavity which has been dug around that portion of the line 12 to be tapped. When the connecting operation has been completed, and the valve 10 opened for establishing a flow of fluid to the newly connected branch line, the ditch or cavity may be filled in, as is well known, and the valve 10 remains covered and in the open position until such a time as it is necessary to stop the flow of fluid to the branch line for repairs, or the like. As the closure 16 is rotated toward the open position shown in FIGS. 2 and 3, the lip 58 distorts or folds into the recess or area provided by the retainer 60 as hereinbefore set forth. The open edge 23 of the passageway 22 is a sharp edge, particularly designed whereby it folds the lip 58 into the recess provided by the retainer 60. Thus, the seal 52 rides easily over or across the open edge 23 permitting opening of the valve 10. It is to be noted that the cam arm 68 limits the rotation of the closure member 16 in the closing direction to assure that the seal 52 cannot be moved completely across the opening 22. Thus, a portion of the lip 58 is always folded into the said recessed area. Of course, should this be necessary, the buried valve may be uncovered and the closure member rotated to the full closed position therefor. The fluid within the branch line may then be bled off, and the repairs, or the like, accomplished, whereupon the valve 10 may be reopened for resuming the normal use of the branch line.

From the foregoing it will be apparent that the present invention provides a novel plastic valve for facilitating a tapping operation on a main flow system. The novel valve may be quickly and easily installed on the main pipe line, and the closure member may be opened for permitting a free passageway through the valve during the tapping operation. Subsequent to the tapping operation, the valve may be closed whereby the cam means cooperates with the closure member for assuring an efficient sealing of the valve in the closed position thereof. When the branch by-pass or branch line has been connected to the installed valve, the closure member may be opened, and remains so during the normal use of the branch line. Of course, when it is necessary to stop the flow of fluid to the branch line for repair purposes, or the like, the valve may temporarily be closed and opened again when it is desirable to reestablish the normal flow conditions to and through the branch line.

Whereas the present invention has been described in particular relation to the drawings attached hereto, it should be understood that other and further modifications, apart from those shown or suggested herein, may be made within the spirit and scope of this invention.

What is claimed is:

1. A valve for use with a tapping machine and comprising a body portion, closure means rotatably disposed within said body portion to provide alternate open and closed positions for the valve, conduit means extending radially outward from the body portion to provide fluid passageway means to and from said body portion, seal means provided on said closure means for precluding leakage of fluid in the closed position of the valve, cam means provided on the body portion for cooperation with the closure means for assuring an efficient sealing thereof in the closed position regardless of pressure acting against the closure member, and means for securing the valve to a main flow line for use with said tapping machine, said body portion being substantially cylindrical, and said closure means being rotatable about the longitudinal axis thereof, and comprising a disc shaped member rotatably disposed within the body portion, an arm member extending substantially perpendicular from said disc shaped member, said arm member having an arcuate outer periphery complementary to the inner periphery of the body portion, said seal means carried on the outer periphery of the arm member and engagable with the inner periphery of the body portion, and means for rotating said closure means within said body portion, and wherein the arm member of the closure means includes one planar surface engagable with the cam means for urging the closure means into an efficient sealing engagement with the body portion in the closed position of the valve, said planar surface being disposed away from the flow passage in the open position of the valve for precluding interference with movement through the valve.

2. A valve comprising a substantially cylindrical body having one end thereof open and the opposite end thereof closed, a pair of oppositely disposed axially aligned sleeves extending radially outwardly from said body and in communication with the interior thereof to provide inlet and outlet ports for the valve, cam means provided on the inwardly directed surface of the closed end of the body, closure means extending through the open end of the body and into engagement with the cam means, said closure means rotatable about the longitudinal axis of the body to provide alternate open and closed positions for the valve, seal means provided on the closure means for sealing around the inlet port in the closed position of the valve, said cam means cooperating with said closure means for efficiently sealing of the valve in the closed position against pressure exerted against the closure means, means for rotating said closure means within said body, seal means interposed between the closure means and the open end of the body for precluding leakage of fluid therebetween, and locking means cooperating between the closure means and the open end of the body for retaining the closure means in position therein, and wherein the closure means comprises a disc member having an outer diameter complementary to the inner diameter of the body, an arm member extending substantially perpendicularly from the disc and having an arcuate outer periphery complementary to the inner periphery of the body, said arm member being provided with one planar edge for engagement with the cam means, said seal means of the closure means being secured to the arcuate outer periphery of the said arm member for sealing against the inner periphery of the body in the closed position of the valve.

* * * * *